United States Patent
Kotha et al.

(10) Patent No.: US 10,417,146 B1
(45) Date of Patent: Sep. 17, 2019

(54) REAL-TIME RESOURCE HANDLING IN RESOURCE RETRY QUEUE

(71) Applicant: Apple Inc., Cupertino, CA (US)

(72) Inventors: Sridhar Kotha, San Jose, CA (US); Neeraj Parik, San Jose, CA (US); Harshavardhan Kaushikkar, San Jose, CA (US); Srinivasa Rangan Sridharan, San Jose, CA (US); Xiaoming Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/980,713

(22) Filed: May 15, 2018

(51) Int. Cl.
*G06F 13/16* (2006.01)
*G06F 12/0871* (2016.01)
*G06F 9/50* (2006.01)

(52) U.S. Cl.
CPC ........ *G06F 13/1642* (2013.01); *G06F 9/5016* (2013.01); *G06F 12/0871* (2013.01); *G06F 2212/608* (2013.01); *G06F 2213/36* (2013.01)

(58) Field of Classification Search
CPC ............. G06F 13/1642; G06F 12/0871; G06F 9/5016; G06F 2213/36; G06F 2212/608
See application file for complete search history.

(56) References Cited

U.S. PATENT DOCUMENTS

| | | | |
|---|---|---|---|
| 6,487,640 B1 | 11/2002 | Lipasti | |
| 8,645,639 B2 | 2/2014 | Krishnan et al. | |
| 9,075,952 B2 | 7/2015 | Niell et al. | |
| 9,270,610 B2 | 2/2016 | Balkan et al. | |
| 2014/0244920 A1* | 8/2014 | Biswas | G06F 12/084 711/104 |
| 2015/0128142 A1 | 5/2015 | Fahim et al. | |

* cited by examiner

*Primary Examiner* — Ernest Unelus
*Assistant Examiner* — Ronald T Modo
(74) *Attorney, Agent, or Firm* — Meyertons, Hood, Kivlin, Kowert & Goetzel, P.C.

(57) ABSTRACT

An embodiment of an apparatus includes a retry queue circuit, a transaction arbiter circuit, and a plurality of transaction buffers. The retry queue circuit may store one or more entries corresponding to one or more memory transactions. A position in the retry queue circuit of an entry of the one or more entries may correspond to a priority for processing a memory transaction corresponding to the entry. The transaction arbiter circuit may receive a real-time memory transaction from a particular transaction buffer. In response to a determination that the real-time memory transaction is unable to be processed, the transaction arbiter circuit may create an entry for the real-time memory transaction in the retry queue circuit. In response to a determination that a bulk memory transaction is scheduled for processing prior to the real-time memory transaction, the transaction arbiter circuit may upgrade the bulk memory transaction to use real-time memory resources.

20 Claims, 9 Drawing Sheets

REAL-TIME RESOURCE HANDLING IN RESOURCE RETRY QUEUE

BACKGROUND

Technical Field

Embodiments described herein are related to the field of integrated circuit implementation, and more particularly to the management of memory transactions in a memory system.

Description of the Related Art

In environments such as a system-on-chip (SoC), memory transaction requests may be issued from multiple sources, such as, for example, one or more processing cores, a graphics processor, and various other functional circuits and then placed into one or more transaction buffers until appropriate circuits can retrieve and process each transaction. A memory cache controller may retrieve memory transaction requests from the one or more transaction buffers in order to determine which memory resources are needed to process each transaction. Some of these memory transaction requests may be processed upon reception by the cache controller if memory resources are currently available. A portion of the memory access requests, however, may utilize a resource of the memory system that is currently busy fulfilling other requests. Requests utilizing unavailable resources may be identified and queued until the proper resources are available. This process of queuing a memory transaction request until memory resources are available may be referred to as "resource retry."

If multiple requests require unavailable resources, then a number of memory requests added to a resource retry queue may grow. As a result, a response time for completing the memory requests may cause noticeable delays or performance lags in the computing system. In addition, a high priority memory request may become stalled behind lower priority memory requests, potentially leading to a stall of a high priority process, such as, for example, processing of an exception, a trap, or an interrupt.

SUMMARY OF THE EMBODIMENTS

Broadly speaking, a system, an apparatus, and a method are contemplated in which the apparatus includes a plurality of transaction buffers, each configured to store a plurality of memory transactions. The apparatus may further include a retry queue circuit that is configured to store one or more entries corresponding to one or more memory transactions. A position in the retry queue circuit of a particular entry of the one or more entries corresponds to a priority for processing a memory transaction corresponding to the particular entry. The apparatus may also include a transaction arbiter circuit that is configured to receive a real-time memory transaction from a particular transaction buffer of the plurality of transaction buffers. In response to a determination that the real-time memory transaction is unable to be processed, the transaction arbiter circuit may be configured to create an entry for the real-time memory transaction in the retry queue circuit. In response to a determination that a bulk memory transaction is scheduled for processing prior to the real-time memory transaction, the transaction arbiter circuit may be configured to upgrade the bulk memory transaction to use real-time memory resources. The real-time memory transaction may have a higher priority than the bulk memory transaction.

The method may comprise receiving a real-time memory transaction from a particular transaction buffer of a plurality of transaction buffers. The real-time memory transaction may have a higher priority than a bulk memory transaction. The method may also comprise, in response to determining that the real-time memory transaction is unable to be processed, creating an entry for the real-time memory transaction in a retry queue circuit. The method may further comprise, in response to determining that a bulk memory transaction is scheduled for processing prior to the real-time memory transaction, upgrading the bulk memory transaction to use real-time memory resources.

The system may include one or more processing cores that are configured to issue a plurality of memory transactions with one of at least a bulk priority level or a real-time priority level. The real-time priority level may have a higher priority than the bulk priority level. The system may further include a memory cache controller that is configured to receive a real-time memory transaction from a particular processing core of the one or more processing cores, and to, in response to a determination that the real-time memory transaction is unable to be processed, create an entry for the real-time memory transaction in a retry queue circuit included in the memory cache controller. The memory cache controller may also be configured to, in response to a determination that a bulk memory transaction is scheduled for processing prior to the real-time memory transaction, upgrade the bulk memory transaction to use real-time memory resources.

BRIEF DESCRIPTION OF THE DRAWINGS

The following detailed description makes reference to the accompanying drawings, which are now briefly described.

Figure 1:
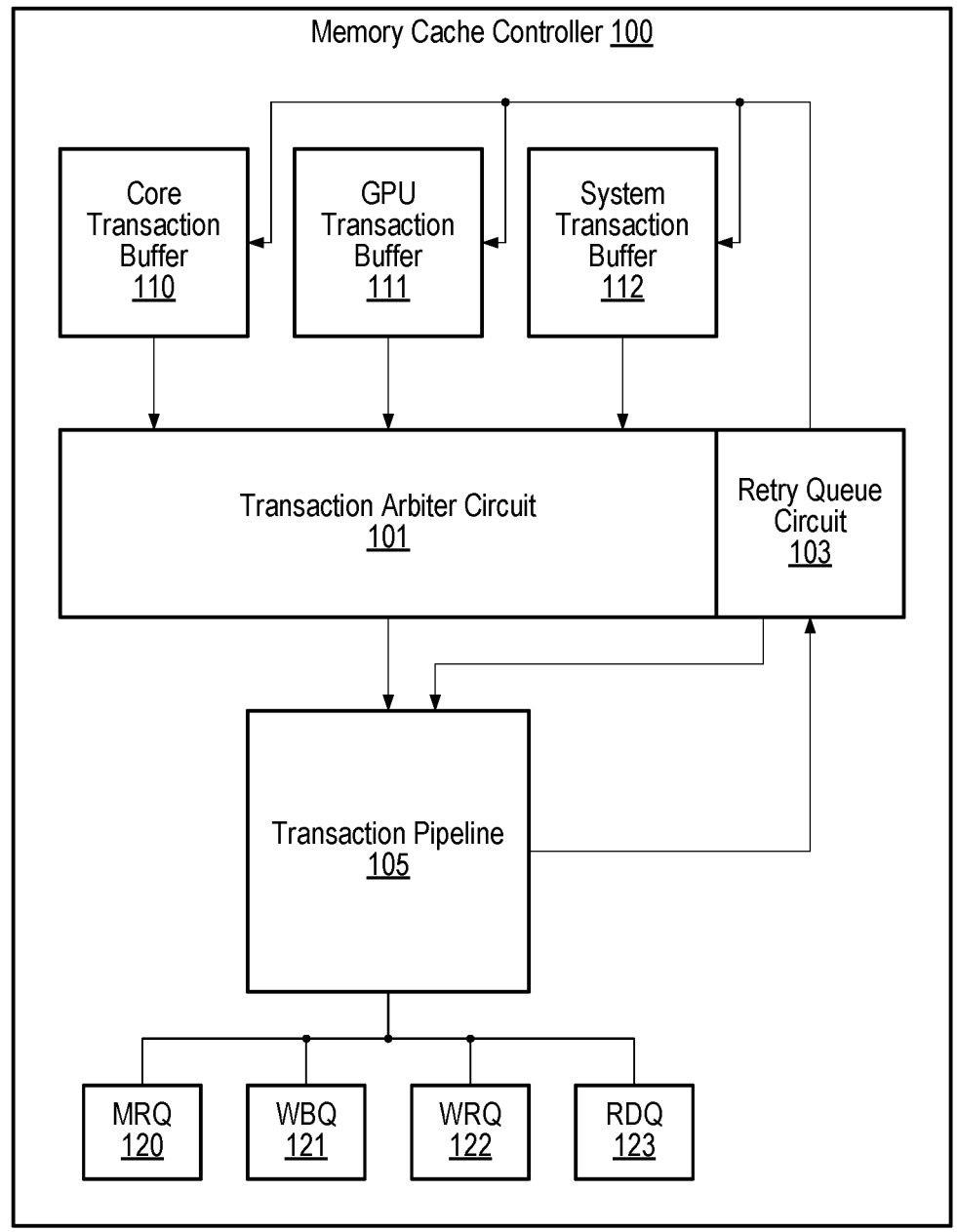
FIG. 1 illustrates a block diagram of an embodiment of a memory cache controller.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Some computing systems allow for queuing of memory commands, also referred to herein as "memory transactions" or simply "transactions," that are waiting for particular resources to become available, such that a given memory transaction may be processed as resources become available. As a number of memory transactions in the retry queue grows, a delay time for memory transactions to be processed may increase, particularly for memory transactions placed at the end of a long queue. If a high priority memory transaction is placed in the retry queue, then it might be stalled waiting for lower priority memory transactions ahead of it in the retry queue.

As used herein, a "memory resource" refers to a resource queue or buffer that stores a memory operation related to memory transactions. For example, a given memory transaction to write a value to a particular memory address may result in several memory operations, such as, for example, a first operation to write the value to a first location in a first cache memory, a second operation to write the value to a second location in a second cache memory, and a third operation to write the value to the memory address specified in the memory transaction. Each of these three operations may be buffered in a respective resource queue and executed at different times when the respective memory is available to process the corresponding write operation.

Embodiments of systems and methods for managing a retry queue are disclosed herein. The disclosed embodiments demonstrate methods for adding and prioritizing memory commands to the retry queue such that delays for processing high priority memory transactions may be reduced. Reducing delay times for a high priority memory transaction may improve performance of a system, or may reduce an amount of time that a user of the system has to wait for feedback from an action performed by the user. For example, reducing a time from a user selecting a particular option in an application to receiving feedback for the selection may improve the user's perception of performance of the application and the system.

A block diagram for an embodiment of a cache controller circuit is illustrated in FIG. 1. Memory Cache Controller 100 may be included as a circuit in an integrated circuit, such as a system-on-chip (SoC), and may receive memory transactions issued by multiple sources. As used herein, a "memory transaction" or simply "transaction" refers to a command or request to read, write, or modify content (e.g., data or instructions) stored in a memory location corresponding to a particular address. In various embodiments, the address may be provided as a logical address, a physical address, or either. In the illustrated embodiment, Memory Cache Controller 100 includes Transaction Arbiter Circuit 101 coupled to Retry Queue Circuit 103 and Transaction Pipeline 105. Transaction Pipeline 105 is further coupled to a plurality of resources, including, but not limited to, memory read response queue (MRQ) 120, writeback queue (WBQ) 121, write command queue (WRQ) 122, and read command queue (RDQ) 123. Memory transactions received by Memory Cache Controller 100 are stored in one of several transaction buffers, including, Core Trans Action Buffer 110, GPU Transaction Buffer 111, and System Transaction Buffer 112.

In the illustrated embodiment, Memory Cache Controller 100 may receive a memory transaction from any processor in the SoC, such as, for example, a processing core, a graphics processor, or any suitable peripheral or circuit in the SoC. Some memory transactions may be fulfilled by accessing a main system memory or a storage device. In some computing systems, the amount of time required to read/write data from/to the main system memory or the storage device may be longer than an execution time of several processor instructions. To enable faster access to frequently accessed content, issued memory transactions are sent to Memory Cache Controller 100 which may provide faster fulfillment of the memory transactions by storing content from frequently accessed memory locations in a cache memory that can be read and written faster than the main system memory or the storage device. After receiving a memory transaction, Memory Cache Controller 100 determines if an address included in the memory transaction corresponds to an address currently stored in the cache memory. If the corresponding address for the memory transaction is currently stored in the cache memory, then Memory Cache Controller 100 performs the transaction on a cached copy of requested content. Otherwise, if the address included in the memory transaction is not currently stored in the cache memory, then Memory Cache Controller 100 issues a command to retrieve data at the address included in the memory command.

Memory transactions received by Memory Cache Controller 100, in the illustrated embodiment, are buffered in the appropriate one of Core Trans Action Buffer 110, GPU Transaction Buffer 111, or System Transaction Buffer 112, (collectively referred to as Transaction Buffers 110-112) based on which circuit issued the transaction. Memory transactions may, in some embodiments, be stored in each of Transaction Buffers 110-112 in "program order," i.e., an order in which the memory transaction occurs within a flow of a software program or application. In other embodiments, the received memory transactions may be stored in Transaction Buffers 110-112 in an order in which they are issued by a respective processing core. If the resources (e.g., one or more of MRQ 120, WBQ 121, WRQ 122, RDQ 123, or other resources not shown in FIG. 1) are available, and a transaction with a higher priority is not waiting for any of the same resources, then the transaction is ready and Transaction Arbiter Circuit 101 may send the ready transaction to Transaction Pipeline 105 which uses the available resources to process the transaction.

Transaction Arbiter Circuit 101 is a functional circuit that reads a transaction stored in one of Transaction Buffers 110-112 and determines priority of the transaction and if the resources to be used to fulfill the transaction are available. Transaction Arbiter Circuit 101 may include one or more state machines, combination logic gates, or other type of processing circuits to retrieve and evaluate a memory transaction and determine if the transaction is ready to be sent to Transaction Pipeline 105 for processing.

If one or more resources are not available, then Transaction Arbiter Circuit 101 may place the transaction into Retry Queue Circuit 103. Retry Queue Circuit 103 is a functional circuit that includes storage, such as, e.g., a plurality of registers or a block memory, for storing information related to one or more memory transactions that are temporarily unable to proceed with processing. "Placing" a transaction into Retry Queue Circuit 103 corresponds to creating an entry in Retry Queue Circuit 103 corresponding to the transaction. An entry in Retry Queue Circuit 103 may include any of a value representing a memory command, an address or addresses for the command (either logical or physical address), a value representing a priority of the transaction, a value representing an age or length of time since the transaction was issued, and any other suitable values that may be used in the processing of the transaction. Retry Queue Circuit 103, in the illustrated embodiment, includes a memory or register circuit configured to store entries corresponding to memory transactions that Transaction Arbiter has attempted to fulfill, but are blocked for one or more reasons, such as, e.g., resources being unavailable. A position of an entry within Retry Queue Circuit 103 is indicative of a priority for fulfilling the corresponding transaction. A first position, or initial position, also referred to as the head of the queue, corresponds to the highest priority entry in Retry Queue Circuit 103. A position next to the initial position corresponds to a next highest priority, and so on. It is noted, that in various embodiments, a position in Retry Queue Circuit 103 may or may not correspond to a physical location within the queue. For example, in some embodiments, Retry Queue Circuit 103 may be implemented as a register file in which entries are physically shifted into adjacent locations in the register file when a higher priority entry is removed to be processed. In other embodiments, Retry Queue Circuit 103 may be implemented as a logical queue in which a given entry may not physically move into a higher priority position, but instead, positions within the logical queue are assigned a logical position in the queue and this assignment is updated to "move" the given entry into a higher priority position. Furthermore, a transaction that is referred to as "ahead" of a given transaction refers to a transaction in a higher position or higher priority than the given transaction, and, conversely, a transaction that is said to be behind a given instruction has a lower position/priority than the given transaction.

In addition to one or more resources being unavailable, a given memory transaction may be placed in Retry Queue Circuit 103 due to a blocking transaction being ahead of the given transaction. A blocking transaction refers to a transaction that accesses a same physical address as a given transaction. If both transactions read the same address without modifying the content at the address, then the given address may not be blocked. If, however, either transaction writes or otherwise modifies the content of the address, then the transaction that is ahead blocks the transaction that is behind, in which case the transaction that is behind is not processed until after the transaction that is ahead is processed through the transaction pipeline.

Memory transactions may include a priority for selecting the transaction for processing in relation to other memory transactions. This priority may be assigned to each transaction or may be inherent to a type or command included in the transaction. In the illustrated embodiment, priority levels include at least a bulk priority level and a real-time priority level with a higher priority level than the bulk priority level. Real-time memory transactions may be processed as quickly as resources allow, thereby reducing delays associated with fulfilling these types of transactions. In some embodiments, additional resources may be included in Memory Cache Controller and in other portions of the SoC. These additional resources may be reserved for use with real-time memory transactions. A real-time memory transaction, however, may still be placed into Retry Queue Circuit 103 due to an unavailable resource and/or a blocking transaction ahead of the real-time transaction. It is noted that bulk and real-time memory transactions are used throughout this disclosure as examples of two priority levels for memory transactions. It is contemplated, however, that the disclosed concepts may be applied to systems and devices with any suitable number of priority levels.

Transaction Arbiter Circuit 101, in the illustrated embodiment, handles real-time transactions differently than bulk transactions. In response to a determination that a received real-time memory transaction is unable to be processed, Transaction Arbiter Circuit 101 creates an entry for the real-time memory transaction in Retry Queue Circuit 103, similar as done for a bulk memory transaction. Transaction Arbiter Circuit 101, however, upon determining that a bulk memory transaction is in Retry Queue Circuit 103 and scheduled for processing prior to the real-time memory transaction, upgrades the prior scheduled bulk memory transaction to use real-time memory resources.

As part of the process for upgrading the bulk memory transaction to a real-time transaction, Transaction Arbiter Circuit 101 releases any resources allocated to the bulk memory transaction prior to upgrading the bulk memory transaction. Transaction Arbiter Circuit 101 then resets an age of the upgraded bulk memory transaction based on a current point in time. By releasing resources acquired while the upgraded memory transaction was a bulk priority, the upgraded memory transaction may acquire resources reserved for real-time memory transactions rather than waiting for resources used by bulk transactions to become available. In addition, resetting the age of the upgraded transaction may help to avoid coming into conflict with a real-time memory transaction that is newer than the original bulk transaction being upgraded, but older than the reset age of the upgraded transaction. Otherwise, if the age of the upgraded transaction is not reset, then a condition may exist in which the prior real-time transaction has already acquired a resource that is also used by the upgraded transaction, but the older age of the upgraded transaction results in another resource to be used by both transactions to be assigned to the upgraded transaction. Thus, a conflict is caused in which each transaction is waiting for the other to finish using a needed resource.

Furthermore, upgrading a bulk memory transaction that is blocking a real-time memory transaction to a real-time priority level may accelerate the processing of the upgraded bulk memory transaction, and thereby reduce a delay until the real-time memory transaction is processed. In addition, in some embodiments, real-time memory transactions may have access to resources that are not available to bulk memory transactions. In such embodiments, an upgraded bulk transaction may acquire resources needed for processing faster than waiting for bulk resources to become available, further accelerating processing of the upgraded transaction, and, accordingly, the real-time transaction.

It is noted that Memory Cache Controller 200 as illustrated in FIG. 1 is merely an example. The illustration of FIG. 1 has been simplified to highlight features relevant to this disclosure. Various embodiments may include different configurations of the circuit blocks, including additional circuit blocks, such as, for example, additional resource circuit blocks. Although three transaction buffers are shown, in other embodiments, a different number of transaction buffers may be included.

Figure 2:
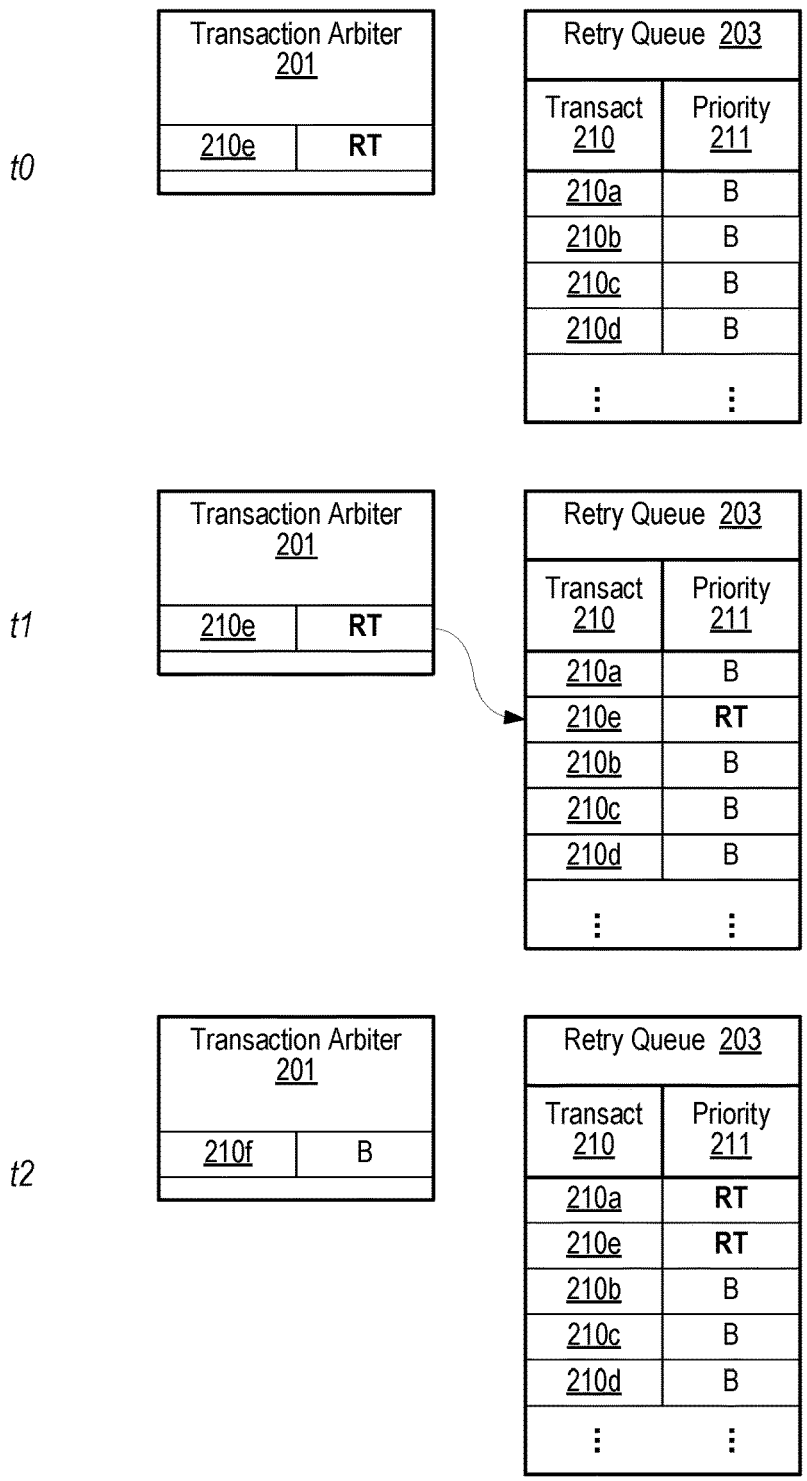
FIG. 2 shows tables of data transactions representing a state of a retry queue at three points in time.

Moving to FIG. 2, an embodiment of a transaction arbiter and a retry queue are shown with contents at three points in time. FIG. 2 includes Transaction Arbiter 201 and Retry Queue 203 at times t0, t1, and t2, as a real-time memory transaction is received by Transaction Arbiter 201. In some embodiments, Transaction Arbiter 201 and Retry Queue 203 correspond, respectively, to Transaction Arbiter Circuit 101 and Retry Queue Circuit 103 in FIG. 1.

At time t0, Retry Queue 203 is shown with four memory transactions in the transaction (Transact) 210 column, transactions 210a-210d, all with bulk priority, as indicated by the "B" in the Priority 211 column. Transaction 210a occupies an initial position in Retry Queue 203, corresponding to a highest priority for transactions 210a-210d, with each position below transaction 210a corresponding to a next highest priority. The remaining three transactions, therefore, rank, in order from highest to lowest, from transaction 210b to transaction 210d. Transaction Arbiter 201 receives transaction 210e which has a real-time priority, as indicated by the "RT." At time t1, Transaction Arbiter 201 determines that transaction 210e cannot proceed due to a lack of available resources. In response, Transaction Arbiter 201 creates an entry in Retry Queue 203 in the second position, adjusting transactions 210b-210d down in priority by one position each. Transaction 210e is placed into the second position entry in Retry Queue 203, with the indicated priority of "RT."

It is noted that transaction 210e is placed into the second position rather than the highest priority first position. This may, in some embodiments, help to avoid interrupting and/or changing a property of a transaction that is at the head of Retry Queue 203 and may have already begun to be processed. By placing the real-time transaction in the second position, the transaction at the head of Retry Queue 203 (i.e., in the first position) may be completed without a potentially changing a property of the transaction if processing has begun on the transaction.

At time t2, Transaction Arbiter 201 determines that transaction 210a is ahead of transaction 210e and has a bulk priority. To help reduce any delays in completing transaction 210a, Transaction Arbiter 201 upgrades transaction 210a to real-time priority. As part of the upgrade process, Transaction Arbiter 201 may cause any resources currently allocated to transaction 210a to be released and modify an age of transaction 210a to correspond to a point in time when the upgrade to the real-time priority occurs. Transaction 210a may now acquire resources reserved for real-time transactions which may allow transaction 210a to be completed sooner than if it is left as a bulk transaction. Also, at time t2, Transaction Arbiter 201 may receive a next transaction, 210f.

It is noted that the embodiment of FIG. 2 is merely an example for demonstrating the disclosed concepts. In other embodiments, Retry Queue 203 may include more than four or five transactions at one time. Although only two priority levels are shown for clarity, any number of priority levels may be implemented. The transactions listed in Retry Queue 203 are presented in descending order of priority. In various embodiments, the order in Retry Queue 203 may correspond to a physical location in the queue or the order may be assigned to a given physical location by setting a particular value in an entry associated with the physical location.

Figure 3:
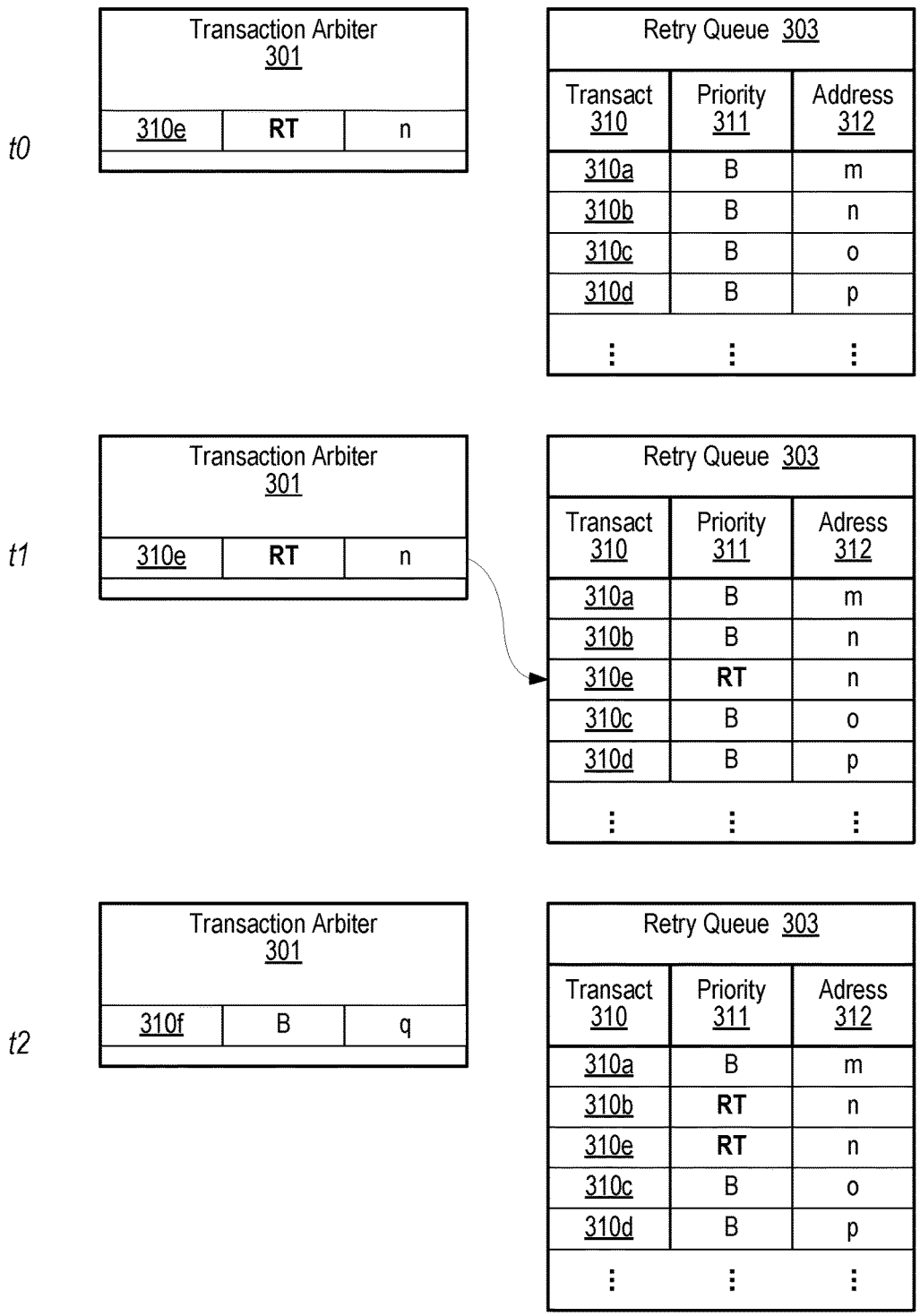
FIG. 3 depicts tables of data transactions representing a state of a retry queue at another three points in time.

Turning to FIG. 3, another embodiment of a transaction arbiter and a retry queue are shown with contents at three points in time. FIG. 3 includes Transaction Arbiter 301 and Retry Queue 303 at times t0, t1, and t2, as a real-time memory transaction is received by Transaction Arbiter 301. Transaction Arbiter 201 and Retry Queue 203, in some embodiments, may correspond to Transaction Arbiter Circuit 101 and Retry Queue Circuit 103, respectively. In the embodiment of FIG. 3, in addition to columns representing a transaction (Transact) 310 and Priority 311, a third column is included that indicates an Address 312 corresponding to a target address for the respective transaction 310.

At time t0, Retry Queue 303 includes four transactions, 310a-310d, each with a bulk priority as indicated by the "B" in the Priority 311 column. Each of these four transactions also includes a respective target address as indicated in the Address column. Transaction Arbiter 301 receives transaction 310e which has a real-time priority as indicated by the "RT" and has a target address of "n." Transaction Arbiter 301 determines that transaction 310b also has a target address of "n" and that transaction 310b blocks transaction 310e. For example, transaction 310b may modify a value of content at address "n" while transaction 310e reads the content at "n." Transaction 310e, therefore, should wait until transaction 310b updates the content at address "n." As another example, transaction 310b may read the content at "n" while transaction 310e modifies the content of "n." In this case, transaction 310e should wait until transaction 310b has read the current value of the content of "n" before modifying this content.

At time t1, after determining that transaction 310e is blocked by transaction 310b, Transaction Arbiter 301 creates an entry in Retry Queue 303. In the illustrated embodiment, the entry is placed in a position just behind blocking transaction 310b. At time t2, Transaction Arbiter 301 upgrades blocking transaction 310b from bulk to real-time priority. Any resources allocated to transaction 310b while it was at the bulk priority are released, and an age of transaction 310b is reset to correspond to the point in time in which it is upgraded to real-time priority. Transaction 310b may now utilize available real-time resources which may reduce the amount of time to acquire the resources to be used to perform memory commands included in transaction 310b, and thereby clearing the way for transaction 310e to be processed.

In the illustrated embodiment, the blocking transaction 310b is in Retry Queue 303 waiting to acquire resources when Transaction Arbiter 301 receives real-time transaction 310e. If, instead, transaction 310b has acquired resources and is entering a transaction pipeline, such as Transaction Pipeline 105, then transaction 310b may, in some embodiments, still be upgraded to a real-time priority. Transaction Pipeline 105 may, similar to Transaction Arbiter 301, release resources allocated to blocking transaction 310b and instead assign real-time resources to transaction 310b, which may result in faster processing through Transaction Pipeline 105 than if transaction 310b is left as bulk priority.

It is noted that the embodiment of FIG. 3 is an example. FIG. 3 is simplified to clearly disclose features of the embodiment. In other embodiments, additional circuits may be included, such as, for example, a transaction pipeline. Retry Queue 303 may include more than the four or five illustrated entries. In some embodiments, Transaction Arbiter 301 may receive more than one transaction at a time.

Figure 4:
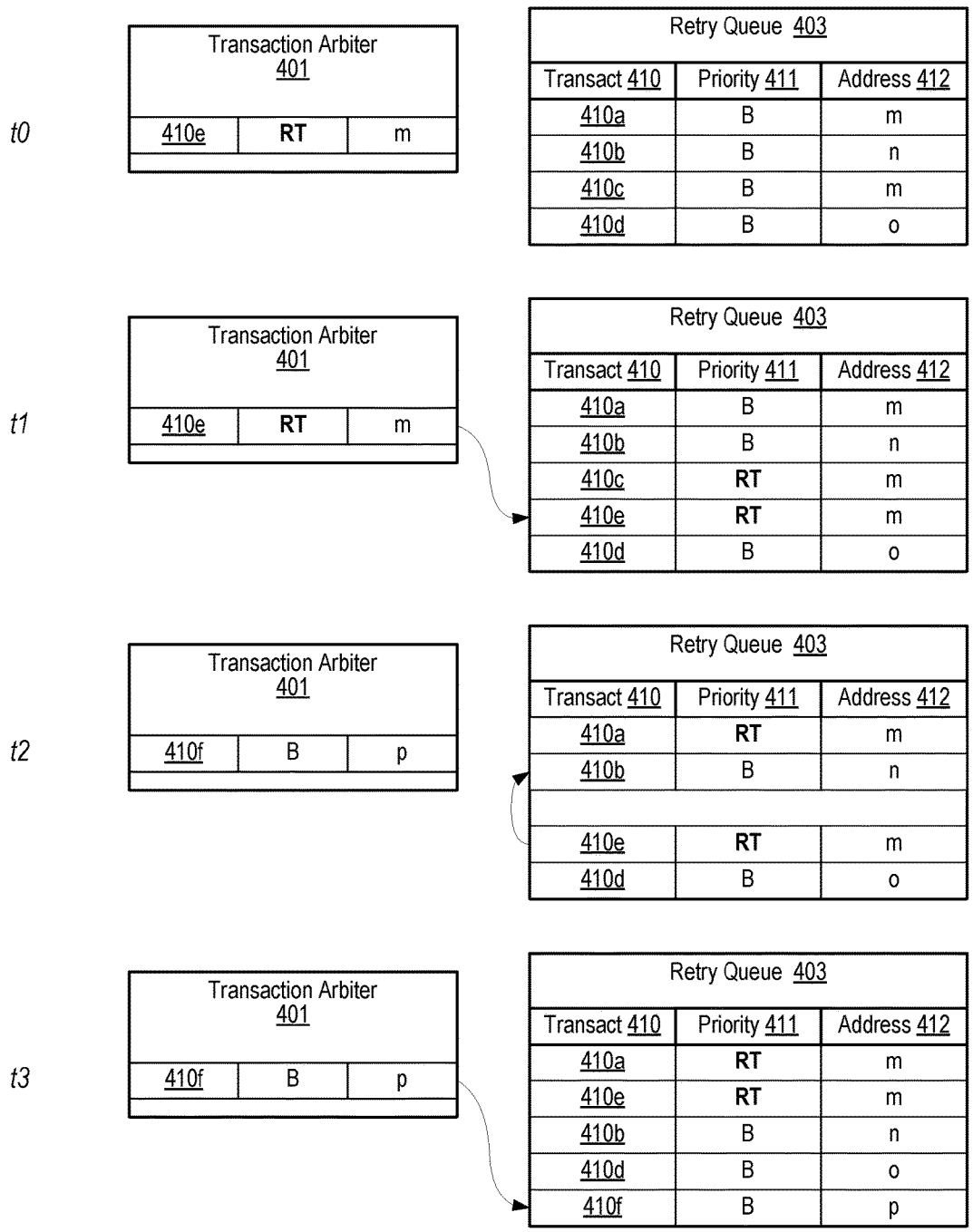
FIG. 4 presents tables of data transactions representing a state of a retry queue at four more points in time.

Moving now to FIG. 4, another embodiment of a transaction arbiter and a retry queue are shown. In the illustrated embodiment, four points in time (t0, t1, t2, and t3) are illustrated for the circuit blocks. FIG. 4 includes Transaction Arbiter 401 and Retry Queue 403, which may, in some embodiments, correspond to Transaction Arbiter Circuit 101, 201, or 301 and Retry Queue Circuit 103, 203, or 303, respectively, in FIGS. 1, 2, and 3. In the embodiment of FIG. 4, columns representing transaction (Transact) 410, Priority 411, and Address 412 are included.

At time t0, Retry Queue 403 includes four transactions, all bulk priority as indicated by the "B" in the Priority 411 column. Two transactions, 410a and 410c, are directed to address "m" as indicated in the Address 412 column. Transaction Arbiter 401 receives transaction 410e with a real-time priority and a target address of "m" and determines that transactions 410a and 410c are blocking transaction 410e. For example, transaction 410e may modify content at address "m" while both transactions 410a and 410c may read the content at address "m" without modifying this content.

At time t1, Transaction Arbiter 401, in the illustrated embodiment, creates an entry in Retry Queue 403 below and next to the entry corresponding to transaction 410c. Transaction Arbiter 401 upgrades transaction 410c similar to the description regarding transaction 310b in FIG. 3 above. By time t2, transaction 410c has, using real-time resources, passed transactions 410a and 410b and has completed processing. Transaction 410e, however, remains blocked by transaction 410a. Transaction Arbiter 401, therefore, upgrades transaction 410a to real-time priority as has been previously described. Meanwhile, Transaction Arbiter 401 may receive a next transaction, transaction 410f. At time t3, Transaction Arbiter 401 promotes transaction 410e into a position behind and adjacent to the position of blocking transaction 410a. In addition, Transaction Arbiter 401, may, if Retry Queue 403 has available space, create an entry at the end of Retry Queue 403 for transaction 410f, received at time t2.

It is noted that in the illustrated example, Transaction Arbiter 401 upgrades transaction 410c ahead of transaction 410a even though transaction 410a is in a higher priority position. By upgrading the lower priority transaction 410c, the higher priority transaction 410a may be able to acquire bulk resources and begin or complete processing while transaction 410c is being processed, thereby reducing a delay time until transaction 410e can be processed. If the higher priority transaction 410a were to be upgraded over transaction 410c, then transaction 410c may be less likely to acquire bulk resources and begin processing.

It is also noted that FIG. 4 is merely an example for presenting the disclosed concepts. Additional circuit blocks may be included in other embodiments. Retry Queue 403 and Transaction Arbiter 401 may be capable of storing a different number of transactions in other embodiments.

Figure 5:
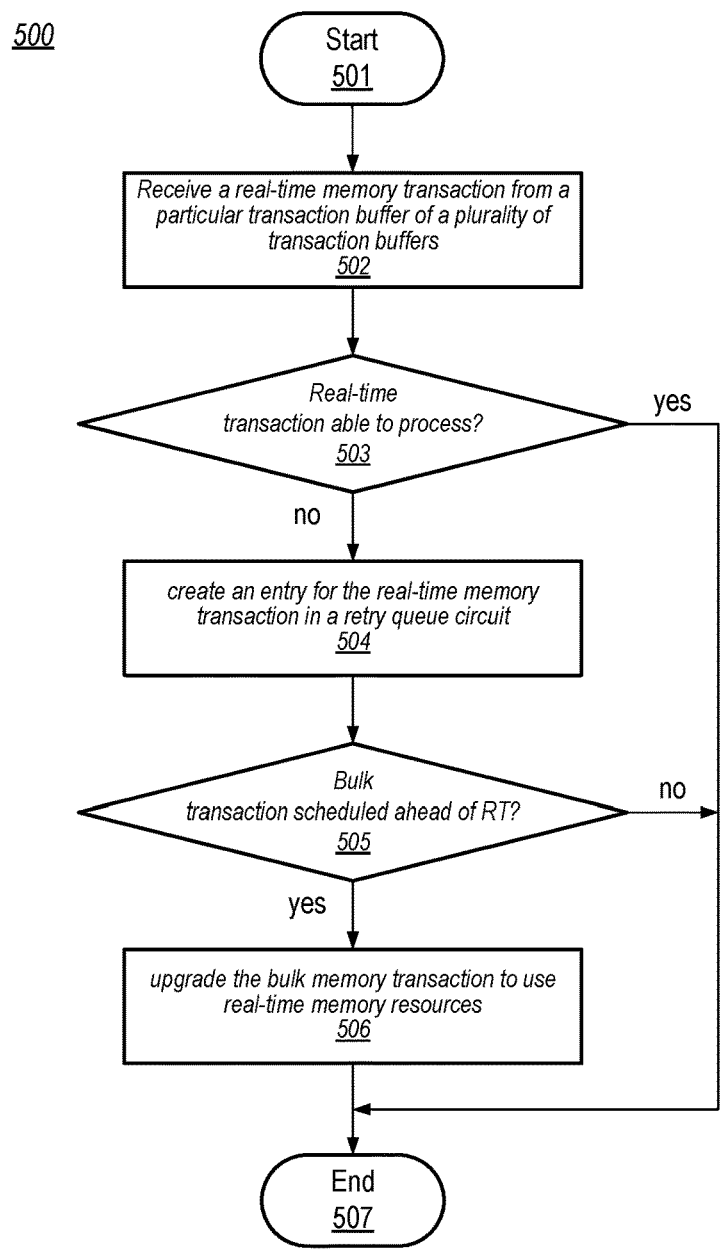
FIG. 5 illustrates a flow diagram of an embodiment of a method for operating a transaction arbiter in a memory cache controller.

Turning now to FIG. 5, a flow diagram illustrating an embodiment of a method for processing a memory transaction in a cache controller is shown. Method 500 may be applied to a cache controller, such as, for example, Memory Cache Controller 100 in FIG. 1. Referring collectively to FIG. 1 and the flow diagram of FIG. 5, the method may begin in block 501.

A transaction arbiter in a memory cache controller receives a real-time memory transaction from a particular transaction buffer of a plurality of transaction buffers (block 502). In the illustrated embodiment, Transaction Arbiter Circuit 101 receives a memory transaction with a real-time priority from one of Core Transaction Buffer 110, GPU Transaction Buffer 111 or System Transaction Buffer 112. The received real-time memory transaction has a higher priority that a bulk memory transaction that may also be processed through Transaction Arbiter Circuit 101.

Further operations of Method 500 may depend on the real-time transaction (block 503). Transaction Arbiter Circuit 101, in the illustrated embodiment, compares the received real-time memory transaction to memory transactions currently stored in a retry queue, such as, for example, Retry Queue Circuit 103, to determine if any queued transactions are blocking processing of the real-time memory transaction. In addition, Transaction Arbiter Circuit 101 determines if resources to be used by the real-time memory transaction are available for allocation to the real-time memory transaction. If a blocking memory transaction or an unavailable resource is identified, then the method moves to block 504 to create an entry for the real-time memory transaction in Retry Queue Circuit 103. Otherwise, the method ends in block 507.

The transaction arbiter creates an entry for the real-time memory transaction in a retry queue circuit (block 504). In the illustrated embodiment, Transaction Arbiter Circuit 101 creates an entry in Retry Queue Circuit 103. If no blocking memory transaction was found, and the real-time memory transaction is unable to proceed due to unavailable resources, then the entry may be made in a second position, next to the initial position, or head, of Retry Queue Circuit 103, such that the real-time transaction is in the second highest priority position in Retry Queue Circuit 103. Otherwise, if one or more blocking transactions are found, then the entry may be made adjacent and below the lowest priority of the blocking transactions.

Continuing operations of the method may depend on transactions ahead of the real-time memory transaction in the retry queue (block 505). Transaction Arbiter Circuit 101 may determine if a lower priority (e.g., bulk) memory transaction is scheduled for processing prior to the real-time memory transaction. For example, if the real-time memory transaction is placed in the second position of Retry Queue Circuit 103 due to unavailable resources, then Transaction Arbiter Circuit 101 determines if the memory transaction in the first position has a lower than real-time priority. If a lower priority memory transaction is ahead of the real-time memory transaction, then the method moves to block 506 to upgrade the lower priority transaction. Otherwise the method ends in block 507.

The transaction arbiter upgrades the bulk memory transaction to use real-time memory resources (block 506). In the illustrated embodiment, Transaction Arbiter Circuit 101 upgrades the lower priority bulk memory transaction that is ahead of the real-time memory transaction in Retry Queue Circuit 103. Upgrading the lower priority bulk memory transaction may include releasing currently allocated resources from the bulk memory transaction. In addition, Transaction Arbiter Circuit 101 may reset an age of the bulk transaction. The method ends in block 507.

It is noted that the method illustrated in FIG. 5 is an example for demonstrating the disclosed concepts. In other embodiments, operations may be performed in a different sequence. Additional operations may also be included.

Figure 6:
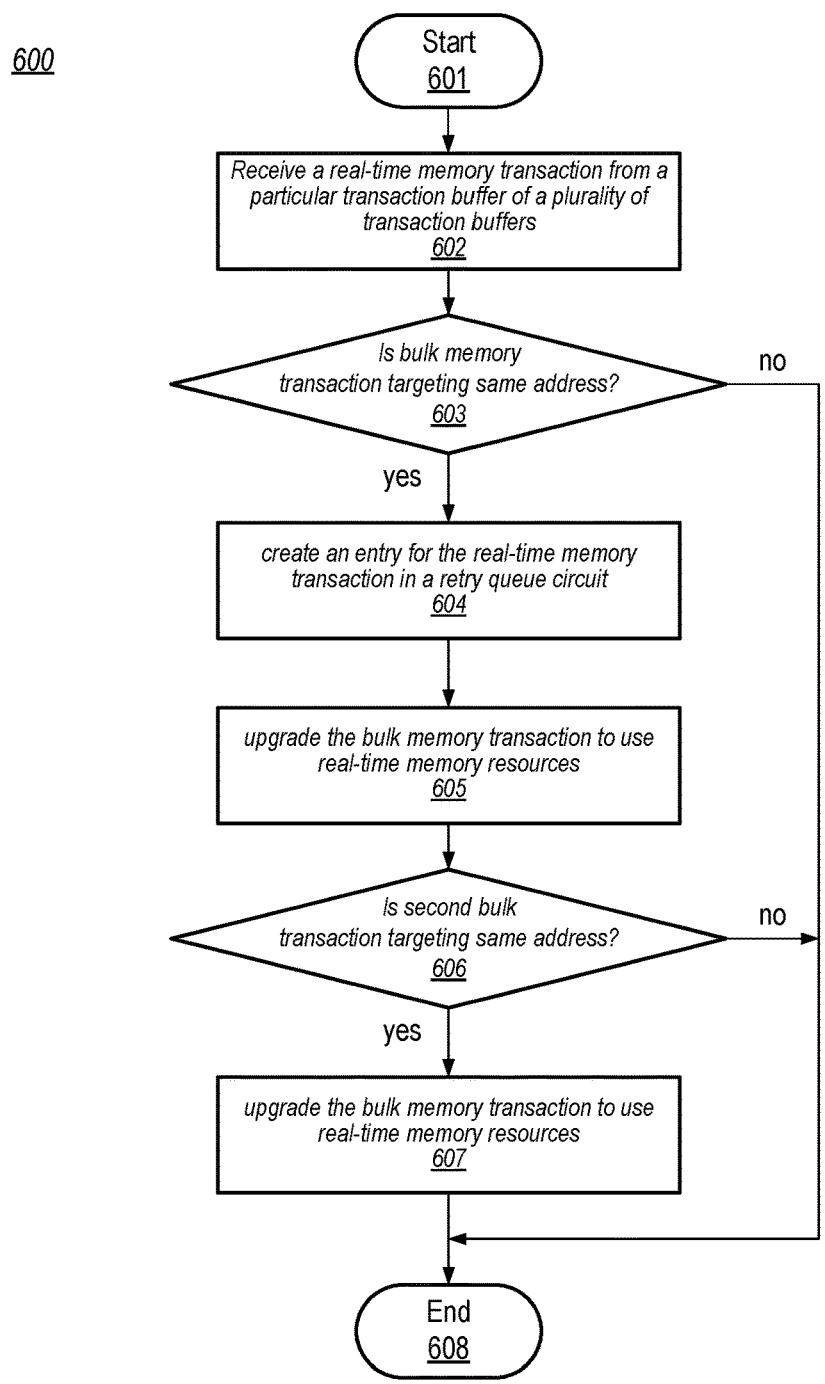
FIG. 6 shows a flow diagram of an embodiment of a method for receiving a real-time memory transaction.

Moving now to FIG. 6, a flow diagram illustrating another embodiment of a method for processing a memory transaction in a cache controller is shown. Like Method 500 in FIG. 5, Method 600 may be applied to a cache controller, such as, for example, Memory Cache Controller 100 in FIG. 1. Referring collectively to FIG. 1 and the flow diagram of FIG. 6, the method may begin in block 601.

A transaction arbiter in a memory cache controller receives a real-time memory transaction from a particular transaction buffer of a plurality of transaction buffers (block 602). Transaction Arbiter Circuit 101, in the illustrated embodiment, receives a memory transaction with a real-time priority from one of Transaction Buffers 110, 111 or 112. The received real-time memory transaction may target a particular memory address.

Subsequent operations of Method 600 may depend on another memory transaction in a retry queue (block 603). Transaction Arbiter Circuit 101 may determine if a bulk memory transaction, ahead of the real-time memory transaction in Retry Queue Circuit 103, targets a same address as the received real-time memory transaction. If another memory transaction is found, then Transaction Arbiter Circuit 101 determines if the bulk memory transaction blocks the received real-time memory transaction. For example, if the bulk memory transaction reads the value at the address and the real-time transaction modifies the value, or vice versa, then the bulk memory transaction may block the real-time memory transaction. If a blocking bulk memory transaction is found, then the method proceeds to block 604 to create an entry for the real-time transaction in Retry Queue Circuit 103. Otherwise, the method ends in block 608.

The transaction arbiter creates an entry for the real-time memory transaction in the retry queue (block 604). In the illustrated embodiment, Transaction Arbiter Circuit 101 creates an entry in Retry Queue Circuit 103, adjacent to and behind, the blocking bulk memory transaction.

The transaction arbiter upgrades the bulk memory transaction to use real-time memory resources (block 605). Transaction Arbiter Circuit 101, in the illustrated embodiment, upgrades the bulk memory transaction to real-time priority. As part of the upgrade process, Transaction Arbiter Circuit 101 may release resources allocated to the bulk transaction as well as reset an age of the bulk transaction, thus allowing the upgraded transaction to acquire real-time resources in place of bulk resources. Using real-time resources may decrease an amount of time for the upgraded memory transaction to be processed.

Further operations of Method 600 may depend on a different memory transaction in the retry queue (block 606). After the upgraded memory transaction enters Transaction Pipeline 105 to begin processing, Transaction Arbiter Circuit 101 may determine if another bulk memory transaction, ahead of the real-time memory transaction in Retry Queue Circuit 103, targets the same address as the real-time memory transaction. If a different memory transaction is found, then Transaction Arbiter Circuit 101 determines if the different bulk memory transaction also blocks the received real-time memory transaction. If so, then Method 600 moves to block 607 to upgrade the different memory transaction. Otherwise, the method ends in block 608.

The different bulk memory transaction is upgraded to use real-time memory transaction resources by the transaction arbiter (block 607). In the illustrated embodiment, Transaction Arbiter Circuit 101 upgrades the different bulk memory transaction to real-time priority. As with the upgrade of the first blocking bulk memory transaction, Transaction Arbiter Circuit 101 may release resources allocated to the bulk transaction as well as reset an age of the bulk transaction. Then, the different upgraded transaction may acquire real-time resources in place of bulk resources.

It is noted that Method 600 illustrated in FIG. 6 is an example. In other embodiments, a different number of operations may be included. In some embodiments, operations may be performed in a different order.

Figure 7:
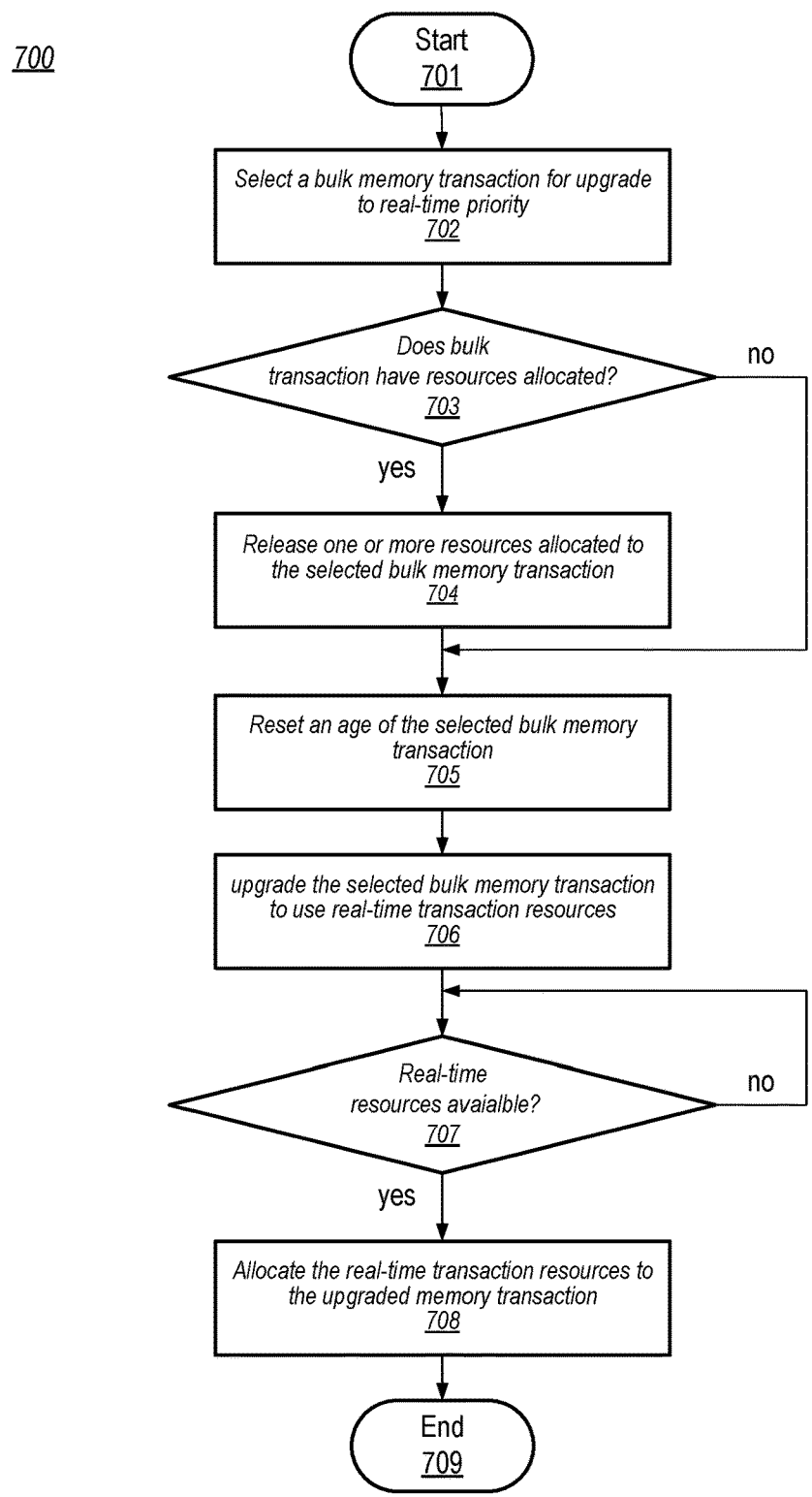
FIG. 7 presents a flow diagram of an embodiment of a method for upgrading a bulk memory transaction.

Proceeding to FIG. 7, a flow diagram illustrating an embodiment of a method for upgrading a memory transaction in a cache controller is shown. As with Methods 500 and 600 in FIGS. 5 and 6, respectively, Method 700 may be applied to a cache controller, such as, for example, Memory Cache Controller 100 in FIG. 1. In some embodiments, operations included in Method 700 may correspond to operations performed in Methods 500 and 600, such as in blocks 506, 605, and/or 607. Referring collectively to the block diagram of FIG. 1 and Method 700 of FIG. 7, the method may begin in block 701.

A transaction arbiter selects a bulk memory transaction for upgrade to real-time priority (block 702). In the illustrated embodiment, Transaction Arbiter Circuit 101 selects a particular bulk memory transaction to upgrade. The particular bulk memory transaction, in some situations, may be selected due to being at the head of Retry Queue Circuit 103 (i.e., in an initial position) with a real-time memory transaction having been placed into Retry Queue Circuit 103 behind the head of the queue in a second position. In other situations, the particular bulk memory transaction may be selected due to blocking a real-time transaction that is behind the bulk transaction in Retry Queue Circuit 103.

Continuing operations of Method 700 may depend on a current allocation of resources (block 703). Transaction Arbiter Circuit 101, in the illustrated embodiment, determines if the selected bulk memory transaction currently has any allocated resources. If resources are currently allocated to the selected bulk transaction, then the method moves to block 704 to release them. Otherwise, the method moves to block 705 to reset an age of the selected bulk transaction.

The transaction arbiter releases one or more resources allocated to the selected bulk memory transaction (block 704). If the selected bulk memory transaction has allocated resources, then Transaction Arbiter Circuit 101 releases these allocated resources. For example, if one or more of MRQ 120, WBQ 121, WRQ 122, RDQ 123, or other memory transaction resource is assigned to the selected bulk transaction, then the allocated resource or resources are released and may be used by another memory transaction waiting for processing.

An age of the selected bulk memory transaction is reset (block 705). In the illustrated embodiment, the age of the selected bulk memory transaction is reset by Transaction Arbiter Circuit 101 to correspond to a current point in time. In some embodiments, an age of a memory transaction may be represented by a value indicative of a point in time or an order in which the memory transaction is received by Transaction Arbiter Circuit 101. In other embodiments, the age may be determined from a point in time or order in which the memory transaction is received into one of Transaction Buffers 110-112.

The transaction arbiter upgrades the selected bulk memory transaction to use real-time transaction resources (block 706). Transaction Arbiter Circuit 101 changes the priority of the selected bulk memory transaction to a real-time priority. With a real-time priority, the upgraded memory transaction may be eligible to utilize real-time resources, which, in some embodiments, may reduce an amount of time for processing the upgraded memory transaction as compared to a non-upgraded bulk memory transaction.

Subsequent operations of Method 700 may depend on an availability of real-time resources (block 707). After being upgraded to use real-time resource, the upgraded memory transaction may wait for real-time resources to become available. Real-time resources, however, may become available more frequently than bulk resources. For example, in some embodiments, bulk memory transactions may be more prevalent than real-time memory transactions, resulting in bulk transaction resources being allocated for a greater amount of time than similar real-time transaction resources. If a real-time transaction resource to be used by the upgraded memory transaction is available, then the method moves to block 708 to assign the available resource. Otherwise, the method remains in block 707.

Real-time transaction resources are allocated to the upgraded memory transaction (block 708). If a real-time transaction resource to be used by the upgraded memory transaction becomes available, and there is not another real-time memory transaction ahead of the upgraded transaction waiting for the same resource, then the available resource is allocated to the upgraded memory transaction. If all resources for processing the upgraded memory transaction have been allocated, then the upgraded memory transaction may enter the transaction pipeline to be processed. Otherwise, the upgraded memory transaction may wait until all needed resources are allocated. The method ends in block 709.

It is noted that the method shown in FIG. 7 is one example for demonstrating the disclosed concepts. Although described as occurring serially, in some embodiments, two or more operations may be performed in parallel. In various embodiments, operations may be performed in a different order, and/or a different number of operations may be included in the method.

Figure 8:
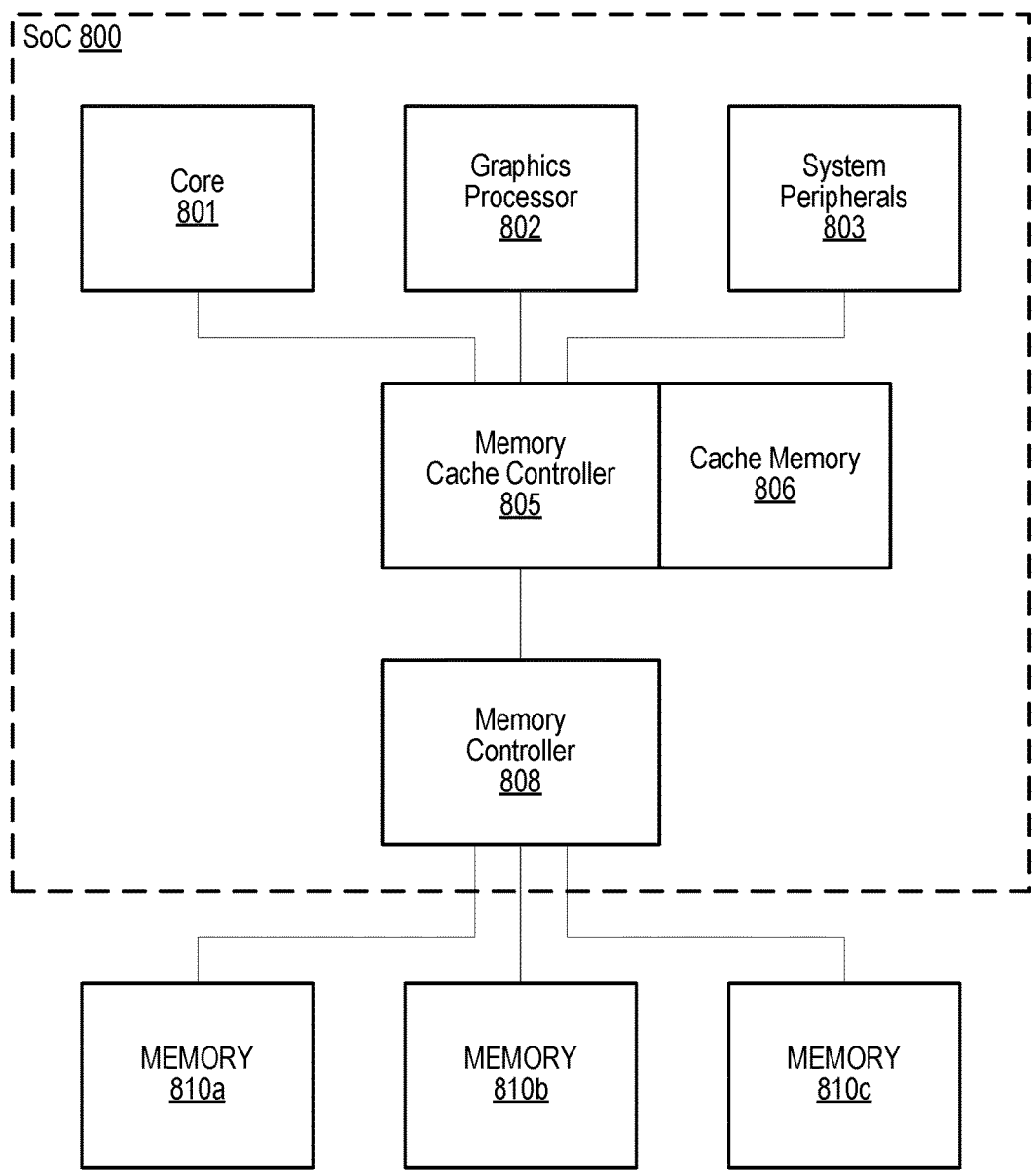
FIG. 8 depicts a block diagram of an embodiment of a system-on-chip (SoC).

A block diagram of an embodiment of a system-on-chip (SoC) is illustrated in FIG. 8. SoC 800 may be representative of an integrated circuit that utilizes the concepts disclosed above. SoC 800 includes several processing cores, including Core 801, Graphics Processor 802, and System Peripherals 803, all coupled to Memory Cache Controller 805. Memory Cache Controller 805 is coupled to Cache Memory 806 and to Memory Controller 808. Memory Controller 808 couples SOC 800 to Memories 810*a*-810*c*.

In the illustrated embodiments, Core 801 is representative of a general-purpose processing core that performs computational operations. Although a single processing core, i.e., Core 801, is illustrated, in some embodiments Core 801 may correspond to a core complex that includes any suitable number of processing cores. In various embodiments, Core 801 may implement any suitable instruction set architecture (ISA), such as, e.g., ARM™, PowerPC®, Blackfin®, or x86 ISAs, or combination thereof. Core 801 may execute instructions and utilize data stored in memories located outside of SoC 800, such as, for example, Memories 810*a*-810*c*, by issuing memory transactions to fetch the instructions and data to be utilized. Data and instructions fetched from Memories 810*a*-810*c* may be cached in Cache Memory 806. In some embodiments, Core 801 may include one or more cache memories in addition to Cache Memory 806.

Graphics Processor 802, in the illustrated embodiment, includes circuitry for processing images or video to be sent to a display screen (not shown). In some embodiments, images and/or videos to be processed by Graphics Processor 802 may be stored in Memories 810*a*-810*c*. Memories 810*a*-810*c* may also store graphics processing instructions for use by Graphics Processor 802 to generate the images. Graphics Processor 802 may correspond to a processing core capable of issuing memory transactions to retrieve graphics data and instructions. Data retrieved from Memories 810*a*-810*c* may be cached in Cache Memory 806.

In the illustrated embodiment, System Peripherals 803 includes one or more circuit blocks for performing any number of suitable tasks. For example, in various embodiments, System Peripherals 803 may include any one or more of communication peripherals (e.g., Universal Serial Bus (USB), Ethernet), encryption engines, audio processors, direct memory access modules, or any other peripheral that may generate memory transactions to retrieve data or commands from Memories 810*a*-810*c*. System peripherals 803 may include one or more processing cores within the various functional circuits that are capable of issuing memory transactions to memory cache controller 805.

Memory Cache Controller 805 may, in some embodiments, correspond to Memory Cache Controller 100 in FIG. 1. In the illustrated embodiment, Memory Cache Controller 805 includes circuits for managing memory transactions issued by Core 801, Graphics Processor 802, and System Peripherals 803. In the illustrated embodiment, Memory Cache Controller 805 decodes memory transactions, translates addresses, and determines if valid content corresponding to the addressed location is currently in Cache Memory 806, or if this data is to be fetched from Memories 810*a*-810*c* or elsewhere. If valid content is not currently cached in Cache Memory 806, then Memory Cache Controller 805 may send the transaction to Memory Controller 808 to fetch the requested data. In some embodiments, SoC 800 may include more than one Cache Memory 806 and may, therefore, include a respective Memory Cache Controller 805 for each Cache Memory 806.

Memory Controller 808 may include one or more memory controller circuits for fulfilling memory transactions from each of Memories 810*a*-*c*. For example, one memory controller circuit may be included for each of Memories 810*a*-810*c*. In the illustrated embodiment, Memory Controller 808 includes circuits used to read and write data to each of Memories 810*a*-810*c*. Memory Controller 808 receives memory transactions from Memory Cache Controller 805 if valid content corresponding to the transaction's address is not currently stored in Cache Memory 806.

Memories 810*a*-810*c* are storage devices that collectively form at least a portion of memory hierarchy that stores data and instructions for SoC 800. More particularly, Memories 810*a*-810*c* may correspond to volatile memory with access times less than a non-volatile memory device. Memories 810*a*-810*c* may therefore be used to store instructions and data corresponding to an operating system and one or more applications read from a non-volatile memory after a system boot of SoC 800. Memories 810*a*-810*c* may be representative of memory devices in the dynamic random access memory (DRAM) family of memory devices or in the static random access memory (SRAM) family of memory devices, or in some embodiments, a combination thereof.

It is also noted that, to improve clarity and to aid in demonstrating the disclosed concepts, the diagram of computer SoC 800 illustrated in FIG. 8 has been simplified. In other embodiments, different and/or additional circuit blocks and different configurations of the circuit blocks are possible and contemplated.

Figure 9:
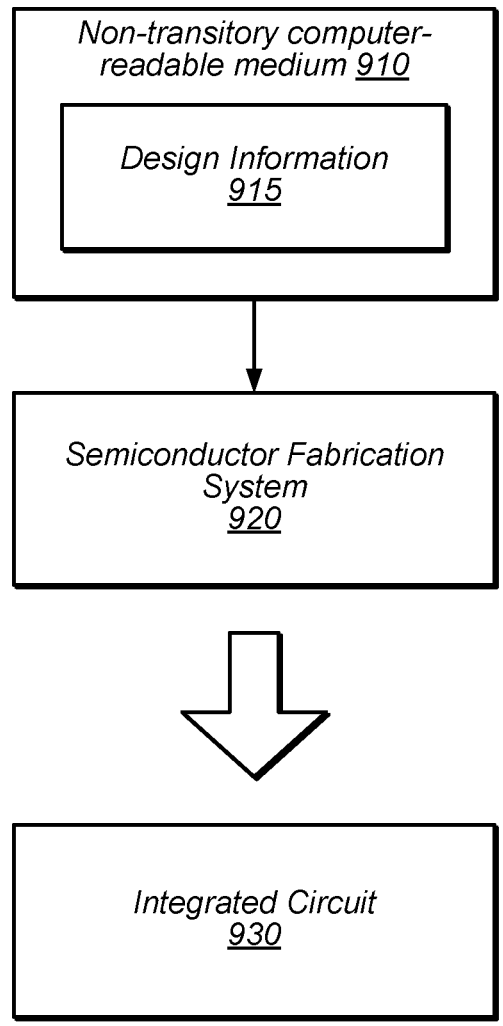
FIG. 9 illustrates a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes SoC 800 of FIG. 8. In the illustrated embodiment, Semiconductor Fabrication System 920 is configured to process the Design Information 915 stored on Non-Transitory Computer-Readable Storage Medium 910 and fabricate Integrated Circuit 930 based on the Design Information 915.

Non-Transitory Computer-Readable Storage Medium 910, may comprise any of various appropriate types of memory devices or storage devices. Non-Transitory Computer-Readable Storage Medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-Transitory Computer-Readable Storage Medium 910 may include other types of non-transitory memory as well or combinations thereof. Non-Transitory Computer-Readable Storage Medium 910 may include two or more memory mediums which may reside in different locations, e.g., in different computer systems that are connected over a network.

Design Information 915 may be specified using any of various appropriate computer languages, including hardware description languages such as, without limitation: VHDL, Verilog, SystemC, SystemVerilog, RHDL, M, MyHDL, etc. Design Information 915 may be usable by Semiconductor Fabrication System 920 to fabricate at least a portion of Integrated Circuit 930. The format of Design Information 915 may be recognized by at least one semiconductor fabrication system, such as Semiconductor Fabrication System 920, for example. In some embodiments, Design Information 915 may include a netlist that specifies elements of a cell library, as well as their connectivity. One or more cell libraries used during logic synthesis of circuits included in Integrated Circuit 930 may also be included in Design Information 915. Such cell libraries may include information indicative of device or transistor level netlists, mask design data, characterization data, and the like, of cells included in the cell library.

Integrated Circuit 930 may, in various embodiments, include one or more custom macrocells, such as memories, analog or mixed-signal circuits, and the like. In such cases, Design Information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor Fabrication System 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor Fabrication System 920 may also be configured to perform various testing of fabricated circuits for correct operation.

In various embodiments, Integrated Circuit 930 is configured to operate according to a circuit design specified by Design Information 915, which may include performing any of the functionality described herein. For example, Integrated Circuit 930 may include any of various elements shown or described herein. Further, Integrated Circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of transaction buffers, each configured to store a plurality of memory transactions;
   a retry queue circuit configured to store one or more entries corresponding to one or more memory transactions, wherein a position in the retry queue circuit of a particular entry of the one or more entries corresponds to a priority for processing a memory transaction corresponding to the particular entry;
   a transaction arbiter circuit configured to:
      receive a real-time memory transaction from a particular transaction buffer of the plurality of transaction buffers;
      in response to a determination that the real-time memory transaction is unable to be processed, create an entry for the real-time memory transaction in the retry queue circuit; and
      in response to a determination that a bulk memory transaction is scheduled for processing prior to the real-time memory transaction, upgrade the bulk memory transaction to use real-time memory resources, wherein the real-time memory transaction has a higher priority than the bulk memory transaction.

2. The apparatus of claim 1, wherein an entry for the bulk memory transaction is in an initial position, and wherein the transaction arbiter circuit is further configured to create the entry for the real-time memory transaction in a position next to the initial position in the retry queue circuit, in response to a determination that one or more resources to be used by the real-time memory transaction are currently unavailable, wherein the initial position of the retry queue circuit corresponds to a highest priority position.

3. The apparatus of claim 1, wherein the transaction arbiter circuit is further configured to release one or more resources allocated to the bulk memory transaction prior to the upgrade of the bulk memory transaction.

4. The apparatus of claim 1, wherein the transaction arbiter circuit is further configured to reset an age of the upgraded bulk memory transaction.

5. The apparatus of claim 1, wherein the transaction arbiter circuit is further configured to upgrade the bulk memory transaction to use real-time memory resources, in response to a determination that the bulk memory transaction and the real-time memory transaction both target a same address.

6. The apparatus of claim 5, wherein the transaction arbiter circuit is further configured to:
determine that a second bulk memory transaction is scheduled to be processed prior to the upgraded bulk memory transaction; and
in response to a determination that the upgraded bulk memory transaction has been processed and the second bulk memory transaction has not been processed, upgrade the second bulk memory transaction to use real-time memory resources.

7. The apparatus of claim 1, further comprising a transaction pipeline configured to process memory transactions, wherein the transaction arbiter circuit is further configured to create the entry for the real-time memory transaction in response to a determination that a blocking memory transaction is in the transaction pipeline, wherein the transaction pipeline is further configured to upgrade the blocking memory transaction to use real-time memory resources in response to the creation of the entry for the real-time memory transaction, and wherein the blocking memory transaction and the real-time memory transaction both target a same address.

8. A method, comprising:
receiving a real-time memory transaction from a particular transaction buffer of a plurality of transaction buffers, wherein the real-time memory transaction has a higher priority than a bulk memory transaction;
in response to determining that the real-time memory transaction is unable to be processed, creating an entry for the real-time memory transaction in a retry queue circuit; and
in response to determining that a bulk memory transaction is scheduled for processing prior to the real-time memory transaction, upgrading the bulk memory transaction to use real-time memory resources.

9. The method of claim 8, further comprising releasing one or more resources allocated to the bulk memory transaction prior to the upgrade of the bulk memory transaction.

10. The method of claim 8, further comprising resetting an age of the upgraded bulk memory transaction.

11. The method of claim 8, wherein determining that the real-time memory transaction is unable to be processed comprises determining that one or more resources to be used by the real-time memory transaction are currently unavailable.

12. The method of claim 11, further comprising creating the entry for the real-time memory transaction in a position next to an initial position in the retry queue circuit that is occupied by the bulk memory transaction, wherein the initial position of the retry queue circuit corresponds to a highest priority position.

13. The method of claim 8, wherein determining that the real-time memory transaction is unable to be processed comprises determining that the bulk memory transaction and the real-time memory transaction both target a same address, wherein the bulk memory transaction comes before the real-time memory transaction in program order.

14. The method of claim 13, further comprising upgrading the bulk memory transaction to use real-time memory resources, in response to a determination that the bulk memory transaction and the real-time memory transaction both target a same address.

15. The method of claim 14, further comprising:
determining that a second bulk memory transaction that is scheduled to be processed prior to the upgraded bulk memory transaction also targets the same address; and
in response to determining that the upgraded bulk memory transaction has been processed and the second bulk memory transaction has not been processed, upgrading the second bulk memory transaction to use real-time memory resources.

16. A system, comprising:
one or more processing cores configured to issue a plurality of memory transactions with one of at least a bulk priority level or a real-time priority level, wherein the real-time priority level has a higher priority than the bulk priority level; and
a memory cache controller configured to:
receive a real-time memory transaction from a particular processing core of the one or more processing cores;
in response to a determination that the real-time memory transaction is unable to be processed, create an entry for the real-time memory transaction in a retry queue circuit included in the memory cache controller; and
in response to a determination that a bulk memory transaction is scheduled for processing prior to the real-time memory transaction, upgrade the bulk memory transaction to use real-time memory resources.

17. The system of claim 16, wherein the memory cache controller is further configured to release one or more resources allocated to the bulk memory transaction prior to the upgrade of the bulk memory transaction.

18. The system of claim 16, wherein the memory cache controller is further configured to reset an age of the upgraded bulk memory transaction.

19. The system of claim 16, wherein to determine that the real-time memory transaction is unable to be processed, the memory cache controller is further configured to determine that one or more resources to be used by the real-time memory transaction are currently unavailable.

20. The system of claim 16, wherein to determine that the real-time memory transaction is unable to be processed, the memory cache controller is further configured to determine that the bulk memory transaction and the real-time memory transaction both target a same address, wherein the bulk memory transaction comes before the real-time memory transaction in program order.

* * * * *